(12) United States Patent
Fripp et al.

(10) Patent No.: US 9,157,298 B2
(45) Date of Patent: Oct. 13, 2015

(54) FLUID FLOW CONTROL

(75) Inventors: Michael Linley Fripp, Carrollton, TX (US); Jason D. Dykstra, Carrollton, TX (US); Liang Zhao, Plano, TX (US); Jean-Marc Lopez, Plano, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 407 days.

(21) Appl. No.: 13/704,024

(22) PCT Filed: Dec. 16, 2011

(86) PCT No.: PCT/US2011/065522
§ 371 (c)(1),
(2), (4) Date: Dec. 13, 2012

(87) PCT Pub. No.: WO2013/089781
PCT Pub. Date: Jun. 20, 2013

(65) Prior Publication Data
US 2013/0153238 A1    Jun. 20, 2013

(51) Int. Cl.
*E21B 34/08* (2006.01)
*E21B 43/12* (2006.01)
*B01D 21/26* (2006.01)
*B01D 45/12* (2006.01)

(52) U.S. Cl.
CPC ............. *E21B 34/08* (2013.01); *B01D 21/265* (2013.01); *B01D 45/12* (2013.01); *E21B 43/12* (2013.01)

(58) Field of Classification Search
CPC ......... E21B 43/12; E21B 34/08; E21B 43/08; B01D 21/265; B01D 45/12
USPC ................... 166/386, 205, 265; 137/808, 809
See application file for complete search history.

(56) References Cited

U.S. PATENT DOCUMENTS

| | | | |
|---|---|---|---|
| 3,586,104 A | 6/1971 | Hyde | |
| 4,801,310 A * | 1/1989 | Bielefeldt | 210/788 |
| 4,895,582 A * | 1/1990 | Bielefeldt | 55/337 |
| 7,246,660 B2 | 7/2007 | Fripp et al. | |
| 7,316,245 B2 | 1/2008 | Bivin | |
| 8,424,609 B2 * | 4/2013 | Duphorne et al. | 166/373 |
| 8,561,704 B2 * | 10/2013 | Teale et al. | 166/334.4 |
| 8,689,892 B2 * | 4/2014 | Noui-Mehidi | 166/386 |
| 8,936,094 B2 * | 1/2015 | Least et al. | 166/373 |
| 2006/0131033 A1 * | 6/2006 | Bode et al. | 166/386 |
| 2007/0246407 A1 * | 10/2007 | Richards et al. | 210/97 |
| 2008/0000539 A1 | 1/2008 | Bivin | |
| 2008/0041588 A1 * | 2/2008 | Richards et al. | 166/265 |

(Continued)

OTHER PUBLICATIONS

International Patent Application No. PCT/US2011/065522, "International Search Report and Written Opinion", Sep. 14, 2012, 8 pages.

*Primary Examiner* — Daniel P Stephenson
(74) *Attorney, Agent, or Firm* — Kilpatrick Townsend & Stockton LLP

(57) ABSTRACT

Fluid flow influencer devices capable of affecting fluid flow for fluid selection are described. Fluid flow influencer devices may affect fluid flowing into a turbulence, such as a vortex, having a structure that is usable to restrict fluid flow in a flow path of a chamber by different amounts based on at least one property of the fluid. The fluid flow control device may be in an autonomous fluid selector, such as a diverter, a vortex-causing device, or a whisker. Fluid properties based on which the flow influencer device can select fluid can include fluid density, fluid velocity, fluid viscosity, and Reynolds number of the fluid flow.

16 Claims, 10 Drawing Sheets

(56) References Cited

U.S. PATENT DOCUMENTS

2008/0283238 A1* 11/2008 Richards et al. .............. 166/228
2011/0079396 A1 4/2011 Russell et al.
2011/0297385 A1 12/2011 Dykstra et al.
2012/0060624 A1* 3/2012 Dykstra .................... 73/861.22
2012/0061088 A1* 3/2012 Dykstra et al. ................ 166/318
2012/0181036 A1* 7/2012 Holderman ................... 166/316
2012/0181037 A1* 7/2012 Holderman ................... 166/319
2012/0255740 A1* 10/2012 Fripp et al. .................... 166/373
2013/0153238 A1* 6/2013 Fripp et al. .................... 166/319

* cited by examiner

FLUID FLOW CONTROL

CROSS-REFERENCE TO RELATED APPLICATIONS

This application is a U.S. national phase patent application under 35 U.S.C. 371 of International Patent Application No. PCT/US2011/065522 entitled "Fluid Flow Control," filed Dec. 16, 2011, the application of which is incorporated herein by reference in its entirety.

TECHNICAL FIELD OF THE INVENTION

The present invention relates generally to devices for controlling fluid flow in a bore in a subterranean formation and, more particularly (although not necessarily exclusively), to devices that are capable of restricting fluid flow by different amounts based on one or more properties of the fluid.

BACKGROUND

Various devices can be installed in a well traversing a hydrocarbon-bearing subterranean formation. Some devices control the flow rate of fluid between the formation and tubing, such as production or injection tubing. An example of these devices is an autonomous fluid selector that can select fluid, or otherwise control the flow rate of various fluids into the tubing.

An autonomous fluid selector can select between desired and undesired fluids based on relative viscosity of the fluids. For example, fluid having a higher concentration of undesired fluids (e.g. water and natural gas) may have a certain viscosity in response to which the autonomous fluid selector directs the undesired fluid in a direction to restrict the flow rate of the undesired fluid into tubing. The autonomous fluid selector includes a flow ratio control assembly and a vortex assembly usable to select fluid based on viscosity. The flow ratio control assembly includes two passageways. Each passageway includes narrowed tubes that are configured to restrict fluid flow based on viscosity of the fluid. For example, one tube in the first passageway may be narrower than the second tube in the second passageway, and configured to restrict fluid having a certain relative viscosity more than fluid having a different relative viscosity. The second tube may offer relatively constant resistance to fluid, regardless of the viscosity of the fluid.

Although this autonomous fluid selector is very effective in meeting desired fluid selection downhole, additional types of autonomous fluid selectors are desirable that can select fluid based on relative viscosity, or select fluid based on one more other fluid properties, such as fluid density, or fluid velocity.

SUMMARY

Certain aspects and embodiments of the present invention are directed to flow influencer devices in chambers that are capable of restricting fluid by a certain amount based on one or more properties of the fluid.

One aspect relates to a flow control device that can be disposed between a subterranean formation and a tubular in a wellbore. The flow control device includes a chamber and a flow influencer device in the chamber. The chamber has an exit opening and a flow path. The flow influencer device can affect fluid flowing into a turbulence having a structure that is based on at least one property of the fluid and the flow influencer device. The chamber can restrict fluid flow in the flow path by different amounts based on the structure of the turbulence.

A feature relates to the properties including at least two of the Reynolds number of the fluid flow, fluid density, fluid velocity, or fluid viscosity.

Another feature relates to the chamber including an inlet and a second exit opening. The inlet is at a first end of the chamber. The second exit opening is located between the exit opening and a second end of the chamber. The flow influencer device is a diverter that is positioned between the inlet and the exit opening. The flow influencer device can influence flow of fluid, based on one or more properties, toward the exit opening and toward the second exit opening, by causing the fluid to flow into a turbulence that is a vortex, and creating an area of low pressure between the diverter and the second end of the chamber.

Another feature relates to the flow influencer device being a vortex-causing device. The chamber includes a port and a tunnel. The port is positioned close to the exit opening than the vortex-causing device. The tunnel can communicatively couple pressure from an area proximate the vortex to the port. The pressure at the port is configured to influence an angle of entry of the fluid into the exit opening.

Another feature relates to the vortex-causing device being coupled to a wall of the chamber. The vortex-causing device includes a square cross-sectional shape, a cylindrical cross-sectional shape, or a triangular cross-sectional shape.

Another feature relates to the flow influencer device being a whisker that can allow fluid to flow into the turbulence that is a vortex in the chamber and influence fluid to flow to the exit opening in the chamber, based on one or more properties by restricting fluid flow flowing in the vortex.

Another feature relates to the flow influencer device being capable of restricting fluid flow in a first position and allowing fluid flow in a second position.

Another feature relates to the flow influencer device being capable of at least partially restricting fluid from flowing to the exit opening in the first position in response to fluid having a first value of a property, and to move to the second position to allow fluid to flow to the exit opening in response to fluid having a second value of the property of the fluid.

Another feature relates to the flow influencer device being a diverter and including a flexible member that couples the diverter to the chamber. The diverter can cause fluid to flow into a shedding vortex. The flexible member can change position by coupling to the fluid flowing into the shedding vortex in response to the fluid having the second value of the property.

Another feature relates to the chamber including a vortex chamber, a first passageway, and a second passageway. The exit opening is located in the vortex chamber. The first passageway is in fluid communication with the vortex chamber for guiding fluid into a vortex in the vortex chamber. The second passageway is in fluid communication with the vortex chamber for guiding fluid toward the exit opening. The flow influencer device is a whisker that can be in the first position in response to fluid having a first value of a property and to be in the second position in response to fluid having a second value of the property.

Another feature relates to the whisker in the first position being capable of restricting fluid flow through the first passageway. The whisker in the second position is capable of allowing fluid flow through the first passageway.

Another feature relates to the whisker being coupled to an inner wall of the vortex chamber. The whisker can restrict fluid flow in a first direction and can allow fluid flow in a second direction that is opposite to the first direction.

Another feature relates to the vortex chamber including a vane element at least partially disposed about the exit opening.

Another feature relates to the vane element being the whisker.

Another feature relates to the whisker being coupled to a wall of the vane element.

Another feature relates to the flow path being an interdigitated flow path formed by part of the chamber. The flow influencer device is a whisker that extends at least partially into the interdigitated flow path. The whisker can increase pressure drop across part of the interdigitated flow path when a property of the fluid is in a first range, and maintain a substantially constant pressure drop across at least part of the interdigitated flow path when the property of the fluid is in a second range.

Another aspect relates to a flow control device that can be disposed in a wellbore. The flow control device includes a flow influencer device in a chamber. The flow influencer device can control flow of fluid between a formation and a tubular by influencing flow of fluid in a first direction when a Reynolds number of the fluid flow is in a first range and by influencing flow of fluid in a second direction when the Reynolds number of the fluid flow is in a second range that is different than the first range.

Another feature relates to the chamber including a exit opening, an inlet at a first end of the chamber, and a second exit opening located between the exit opening and a second end of the chamber. The flow influencer device is a diverter positioned between the inlet and the exit opening. The diverter can cause fluid to flow into a vortex and create an area of low pressure between the diverter and the second end of the chamber. The first direction is toward the exit opening. The second direction is toward the second exit opening.

Another feature relates to the flow influencer device being a vortex-causing device that can cause fluid to flow into a vortex that is structured based on the Reynolds number of the fluid flow. The chamber includes an exit opening, a port, and a tunnel. The port is positioned closer to the exit opening than the vortex-causing device. The tunnel can communicatively couple pressure from an area proximate the vortex to the port. The pressure at the port can influence flow of fluid in the first direction or the second direction. The first direction corresponds to a first angle of flow into the exit opening. The second direction corresponds to a second angle of flow into the exit opening.

Another feature relates to the flow influencer device being a whisker. The first direction corresponds to a flow path that can allow fluid to flow into a vortex in the chamber. The second direction corresponds to a second flow path that can influence fluid toward the exit opening in the chamber without flowing into the vortex.

Another feature relates to the flow influencer device being capable of controlling flow of fluid between the formation and the tubular based on the Reynolds number of the fluid flow and at least one of fluid density, fluid velocity, or fluid viscosity.

These illustrative aspects and features are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
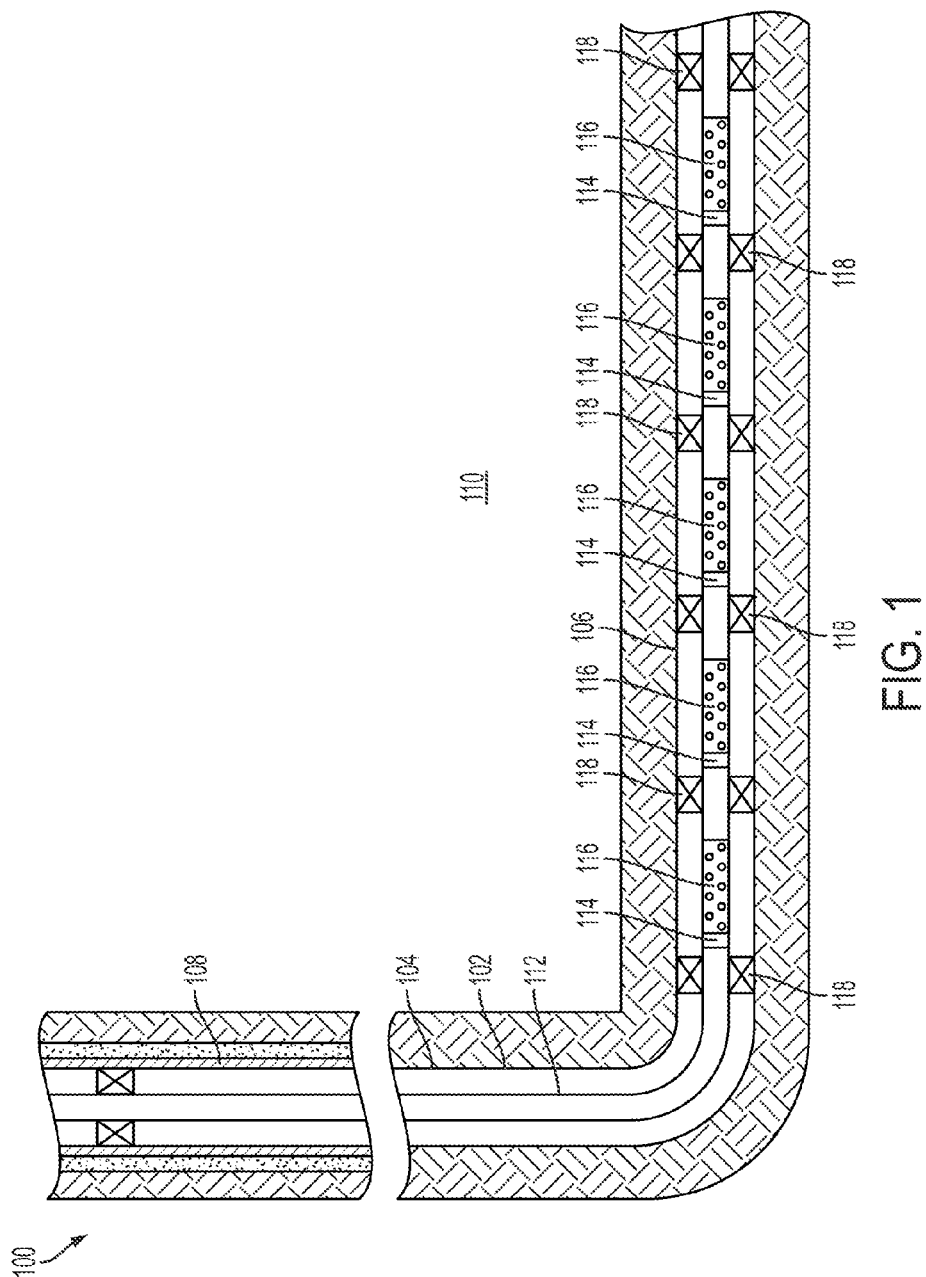
FIG. 1 is a schematic illustration of a well system having fluid flow control devices with flow influencer devices according to one embodiment of the present invention.

Certain aspects and embodiments relate to a fluid flow control device having a flow influencer device that can affect fluid flowing into a turbulence, such as a vortex or eddy, having a structure that is usable to restrict fluid flow in a flow path of a chamber by different amounts based on at least one property of the fluid. The fluid flow control device may be in an autonomous fluid selector. Examples of fluid properties based on which the flow influencer device can select fluid include fluid density, fluid velocity, fluid viscosity, and Reynolds number of the fluid flow. The flow influencer device may be a diverter, a vortex-causing device, or a whisker.

A diverter can be used for fluid separation, where the separation is based on at least one property of the fluid. Diverters according to some embodiments may be movable or immovable, and positioned in a fluid flow path of a chamber between an inlet opening and an exit opening (i.e. upstream from the exit opening). In some embodiments, a diverter is positioned just upstream to the exit opening such as by being positioned closer to the exit opening than the inlet opening. A diverter may be configured to cause fluid having one or more properties to flow into a vortex or other turbulence having a structure. Fluid flowing in the vortex may restrict fluid from, or otherwise reduce the amount of fluid, exiting the exit opening. For example, a diverter may cause fluid flow having a Reynolds number above a certain threshold to flow into a vortex that prevents fluid from exiting through the exit opening. A chamber in which the diverter is positioned may include a second exit opening that is downstream from the diverter and exit opening, and through which the fluid can exit the chamber. A diverter may not cause fluid flow having a relatively low Reynolds number to flow into a vortex (or otherwise the diverter can cause the fluid to flow into a vortex having a less-defined structure), and more fluid can exit the exit opening. Diverters according to various embodiments may have any shape configured for causing fluid having one or more properties at, above, or below a certain amount to flow into a vortex. Examples of shapes in which diverters may be configured include a delta wing-like configuration and a moveable wing.

Diverters according to some embodiments may be coupled to a flexible beam or other similar structure associated with a mechanical resonance frequency. The beam can be configured to move the diverter from a first position to a second position when fluid flows into a shedding vortex configuration having a shedding frequency that is similar or the same as the mechanical resonance frequency of the beam. In some embodiments, the beam can be configured change the position of the diverter to more than two positions. For example, the beam can be configured to be in a first position that restricts fluid at a low flow rate from flowing to the exit opening, in a second position that allows fluid at a medium flow rate to flow to the exit opening, and in a third position that restricts fluid at a high fluid flow rate from flowing to the exit opening.

A vortex-causing device can be used in a fluid flow control device in selecting fluid based on one or more fluid properties. A vortex-causing device according to some embodiments can cause fluid to flow into a vortex, or other turbulence structure. Pressure from an area proximate the vortex can be transported to a port that is closer than the vortex to a bifurcation point. A bifurcation point may be an opening through which fluid can flow, where the angle of entry of fluid into the exit opening can allow the fluid to be selected. Pressure transported to the port can cause the fluid to flow into the bifurcation point by a certain angle, depending on the pressure at the port. The pressure at the port can depend on one or more properties of the fluid that flows into the vortex.

For example, when fluid flow having a relatively high Reynolds number flows into a vortex, a lower pressure is transported from proximate the vortex to the port. The lower pressure at the port can influence fluid flowing towards the bifurcation point to flow towards the port, causing the fluid to enter the bifurcation point at a certain angle to allow a desired fluid selection based on one or more properties of the fluid. When fluid flow having a relatively low Reynolds number flows into the vortex, a higher pressure is transported from the middle of, close to the middle of, or otherwise proximate the vortex to the port. The higher pressure at the port may not influence fluid flow or may influence flow less toward the port, causing the fluid to enter the bifurcation point at a certain angle to allow a desired fluid selection based on one or more properties of the fluid. In some embodiments, the pressure is transported to a port by a tunnel that may be a path, separate from the chamber, from an area in which a vortex can form to the port. The vortex-causing device may any type of device capable of being positioned in a fluid flow path and of causing fluid to flow into a vortex. Examples of vortex-causing devices include those having a square cross-sectional shape, a cylindrical cross-sectional shape, and a triangular cross-sectional shape.

A "whisker" is an elongated member capable of changing position in response to fluid flow. A whisker can improve the performance of an autonomous fluid selector in directing fluid flow. For example, whiskers may control fluid flow based on fluid density and/or fluid velocity. One or more whiskers can be positioned to extend into a flow path of fluid in a chamber of the fluid flow control device. At low fluid momentum, the whiskers can retain a position that at least partially restricts fluid flow through the flow path. At higher fluid momentum, the whiskers can change position to allow more fluid flow through the flow path. Whiskers according to some embodiments can change position by flexing or bending in a direction. Whiskers according to other embodiments can change position by rotating about an axis. Other examples of whiskers include spring-loaded hinged devices. The whiskers can be used in the fluid flow control device for fluid selection, flow diverters, back-pressure elements, guides into vanes, and variable surface roughness elements. In some embodiments, the whiskers can be used for one or more of the above purposes in flow paths that are interdigitated.

In some embodiments, the flow influencer device is in a flow control device that includes a chamber. The flow control device with the flow influencer device can control the flow of fluid between a formation and a tubular. The flow influencer device can influence flow of fluid in a first direction when a Reynolds number of the fluid flow is in a first range and can influence flow of fluid to a second direction when the Reynolds number of the fluid flow is in a second range that is different than the first range.

These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

FIG. 1 depicts a well system 100 with fluid flow control devices having flow influencer devices according to certain embodiments of the present invention. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

A tubing string 112 extends from the surface within wellbore 102. The tubing string 112 can provide a conduit for formation fluids to travel from the substantially horizontal section 106 to the surface. Flow control devices 114 and production tubular sections 116 in various production intervals adjacent to the formation 110 are positioned in the tubing string 112. On each side of each production tubular section 116 is a packer 118 that can provide a fluid seal between the tubing string 112 and the wall of the wellbore 102. Each pair of adjacent packers 118 can define a production interval.

Each of the production tubular sections 116 can provide sand control capability. Sand control screen elements or filter media associated with production tubular sections 116 can allow fluids to flow through the elements or filter media, but prevent particulate matter of sufficient size from flowing through the elements or filter media. In some embodiments, a sand control screen may be provided that includes a non-perforated base pipe having a wire wrapped around ribs positioned circumferentially around the base pipe. A protective outer shroud that includes perforations can be positioned around an exterior of a filter medium.

Flow control devices 114 that include flow influencer devices according to some embodiments can allow for control over the volume and composition of produced fluids. For example, flow control devices 114 may autonomously restrict or resist production of formation fluid from a production interval in which undesired fluid, such as water or natural gas for an oil production operation, is entering. "Natural gas" as used herein means a mixture of hydrocarbons (and varying quantities of non-hydrocarbons) that exists in a gaseous phase at room temperature and pressure and in a liquid phase and/or gaseous phase in a downhole environment.

Formation fluid flowing into a production tubular section 116 may include more than one type of fluid, such as natural gas, oil, water, steam and carbon dioxide. Steam and carbon dioxide may be used as injection fluids to cause hydrocarbon fluid to flow toward a production tubular section 116. Natural gas, oil and water may be found in the formation 110. The proportion of these types of fluids flowing into a production tubular section 116 can vary over time and be based at least in part on conditions within the formation and the wellbore 102. A flow control device 114 according to some embodiments can reduce or restrict production from an interval in which fluid having a higher proportion of undesired fluids.

When a production interval produces a greater proportion of undesired fluids, a flow control device 114 in that interval can restrict or resist production from that interval. Other production intervals producing a greater proportion of desired fluid, can contribute more to the production stream entering tubing string 112. For example, the flow control device 114 can include a flow influencer device that can control fluid flow rate based on one or more properties of fluid, where such properties depend on the type of fluid.

Although FIG. 1 depicts flow control devices 114 positioned in the substantially horizontal section 106, flow control devices 114 (and production tubular sections 116) according to various embodiments of the present invention can be located, additionally or alternatively, in the substantially vertical section 104. Furthermore, any number of flow control devices 114, including one, can be used in the well system 100 generally or in each production interval. In some embodiments, flow control devices 114 can be disposed in simpler wellbores, such as wellbores having only a substantially vertical section. Flow control devices 114 can be disposed in open hole environments, such as is depicted in FIG. 1, or in cased wells.

Figure 2:
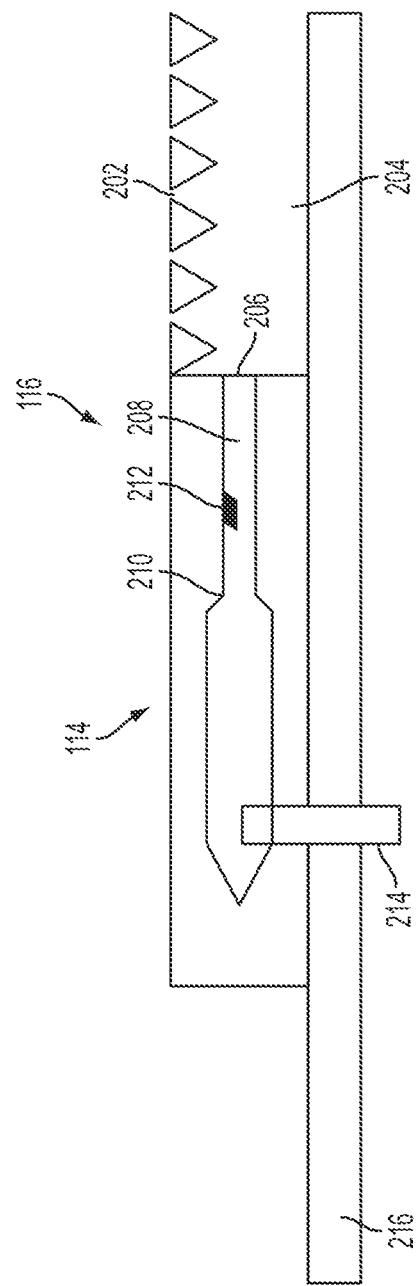
FIG. 2 is a cross-sectional side view of a fluid flow control device and a screen assembly according to one embodiment of the present invention.

FIG. 2 depicts a cross-sectional side view of a production tubular section 116 that includes a flow control device 114 and a screen assembly 202. The production tubular defines an interior passageway 204, which may be an annular space. Formation fluid can enter the interior passageway 204 from the formation through screen assembly 202, which can filter the fluid. Formation fluid can enter the flow control device 114 from the interior passageway through an inlet 206 to a flow path 208 of a chamber 210. Disposed in the flow path 208 of the chamber 210 is a flow influencer device 212. The flow influencer device 212 can cause fluid in the flow path 208 to flow into a vortex. The vortex is usable by the chamber 210 to restrict or allow fluid to flow though an outlet 214 via an exit opening in the chamber 210 by different amounts to an internal area of tubing 216. The structure of the vortex may be based on a configuration of the flow influencer device 212 and at least one property of the fluid. Although one outlet 214 is depicted in FIG. 2, flow control devices according to various embodiments may include any number of outlets and/or exit openings.

Flow influencer devices according to various embodiments may have a variety of configurations by which the flow influencer devices cause fluid to flow into a vortex. Chambers according to various embodiments may also have a variety of configurations capable of using the vortex to restrict fluid flow by different amounts. FIGS. 3-12 and 14-15 depict various embodiments of flow influencer devices and/or chambers capable of restricting fluid flow by different amounts based on one or more properties of the fluid.

Figure 3:
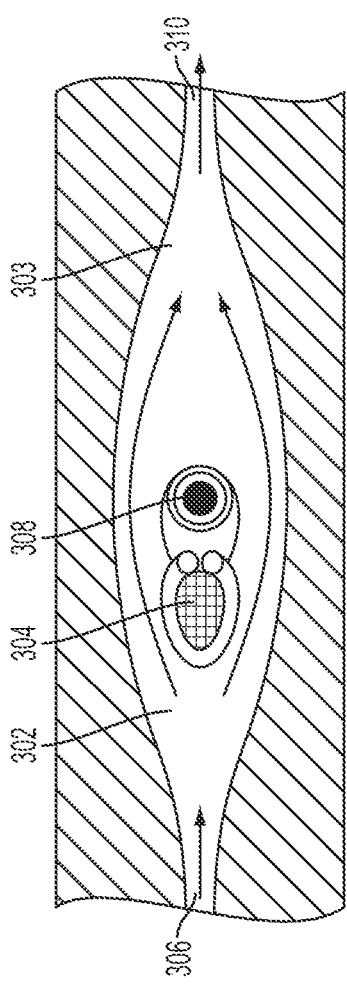
FIG. 3 is a cross-sectional side view of a chamber of a fluid flow control device that includes a flow influencer device that is a diverter according to one embodiment of the present invention.

FIG. 3 depicts a chamber 302 of a flow control device having a flow path 303 in which a flow influencer device that is a diverter 304 is disposed. The chamber 302 includes an inlet 306, a first exit opening 308, and a second exit opening 310. In other embodiments, the chamber 302 does not include the second exit opening 310.

The diverter 304 is positioned upstream from the first exit opening, i.e. between the inlet 306 and the first exit opening 308. In some embodiments, as is depicted in FIG. 3, the diverter 304 is positioned closer to the first exit opening 308 than the inlet 306. The diverter 304 may be coupled to an inner wall of the chamber, coupled to another component, or floating in the fluid. The diverter 304 may be any shape. An example of a suitable shape includes a delta wing.

The diverter 304 can cause fluid flowing through the flow path 303 to flow into a vortex or other turbulence structure such as an eddy. Fluid having a certain one or more properties may flow into a vortex that restricts fluid from flowing through the first exit opening 308 such that more fluid flows to the second exit opening 310. The vortex may create a low pressure area downstream from the diverter 304. The low pressure area can create a pressure drop between the area proximate the first exit opening 308, which may restrict fluid from flowing through the first exit opening 308. In some embodiments, the fluid having a different property may not flow into a vortex, or may flow into a weakly structured vortex, and more of the fluid can flow through the first exit opening 308 than the second exit opening 310.

For example, fluid flow having a Reynolds number in a first range may flow into a vortex that restricts flow through the first exit opening 308. More of the fluid may flow through the second exit opening 310 than the first exit opening 308. The fluid may have a greater amount of undesired fluid. Fluid flowing through the second exit opening 310 may be provided to another fluid selector device that performs additional fluid selection on the fluid, or otherwise restricted from being produced through a production tubing. Fluid flow having a Reynolds number in a second range may not flow into a vortex such that more fluid flows through the first exit opening 308 than the second exit opening 310. The fluid may have a greater amount of desired fluid.

Diverters according to certain embodiments may cause fluid to flow into a vortex usable to select fluid without using a diode. A diode may include multiple flow paths to a vortex chamber having an exit opening. One flow path may guide fluid to flow into a vortex in the vortex chamber. A second flow path may guide fluid to flow toward the exit opening. Although effective at fluid selection, diverters according to some embodiments offer additional or alternative options than a diode for fluid selection. For example, a diode may be in fluid communication with one or more of the exit openings 308, 310 of the embodiment shown in FIG. 3 to perform further fluid selection.

Figure 4:
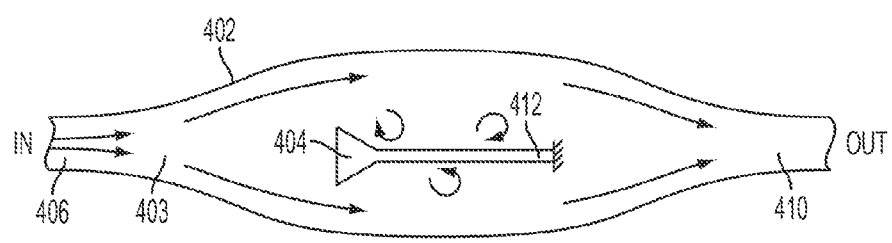
FIG. 4 is a cross-sectional side view of a chamber having a diverter and a flexible member in a restrictive position according to one embodiment of the present invention.
Figure 5:
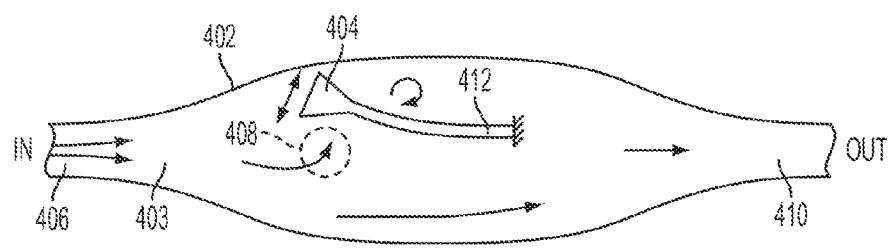
FIG. 5 is a cross-sectional side view of the diverter and flexible member of FIG. 4 in an open position according to one embodiment of the present invention.

In some embodiments, a diverter is capable of restricting an exit opening based on the diverter causing fluid to flow into a vortex. FIGS. 4 and 5 depict a chamber 402 in which a diverter 404 is disposed in a flow path 403. The chamber 402 includes an inlet 406, a first exit opening 408, and a second exit opening 410. The diverter 404 is coupled to a flexible member 412, such as a beam, rod, or other device. In FIG. 4, the diverter 404 is at a first position that restricts fluid flow through the first exit opening 408. Fluid flowing through the flow path 403 can flow to the second exit opening 410.

The flexible member 412 may be associated with a mechanical resonance frequency. The diverter 404 may cause fluid flowing from the inlet 406 toward the second exit opening 410 to flow into a shedding vortex. Fluid having one or more properties may flow into a vortex that sheds at a shedding frequency that is similar to the mechanical resonance frequency of the flexible member 412 such that the force of the shedding vortex causes the flexible member 412 to move the diverter 404 from the first position to a second position, as depicted in FIG. 5. The diverter 404 at the second position may allow at least some of the fluid flowing through the flow path 403 to flow through the first exit opening 408. When fluid having different properties flows into a vortex that sheds at a different shedding frequency, and that is not similar to the mechanical resonance frequency of the flexible member 412, the flexible member 412 may return the diverter 404 to the first position that restricts fluid from flowing through the first exit opening 408. The flexible member 412 can be configured to move the diverter in response to fluid having a greater concentration of undesired or desired fluid, depending on which exit opening through which the respective types of fluid is to flow.

In other embodiments, fluid having a certain amount of one or more properties may flow into a vortex street—a vortex alternating shedding on the right and left of the vortex. The flexible member 412 can be configured to change position in response to the fluid flowing into the vortex street by changing the position of the diverter 404 to allow fluid to flow through the first exit opening 408.

Alternatively, a diverter may be in a first position that allows fluid to flow through a first exit opening. The diverter can cause fluid having a certain amount of one or more properties to flow into a vortex that causes a flexible member to move the diverter from the first position to a second position that restricts fluid from flowing through the first exit opening.

Figure 6:
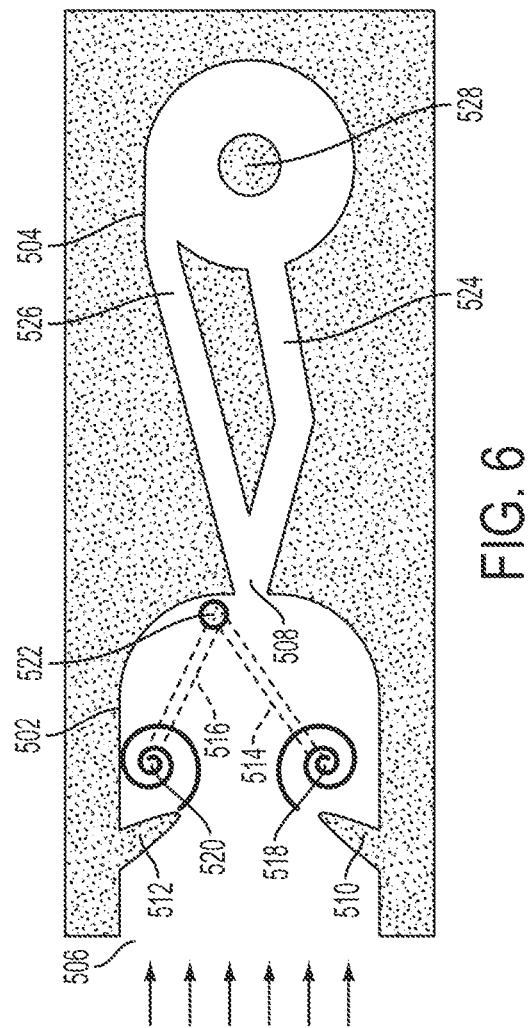
FIG. 6 is a cross-sectional top view of a vortex chamber and a chamber having tunnels and flow influencer devices that are vortex-causing devices according to one embodiment of the present invention.

Flow influencer devices according to other embodiments may be vortex-causing devices in chambers capable of using pressure from the vortex to influence an angle that fluid enters an exit opening. FIG. 6 depicts a cross-sectional top view of a chamber 502 of a flow control device that also includes a vortex chamber 504. The chamber 502 includes an inlet 506 and an exit opening that is a bifurcation point 508. In the chamber 502 are two vortex-causing devices 510, 512 that are each capable of causing fluid flowing from the inlet 506 to the bifurcation point 508 to flow into respective vortices. Vortex-causing devices 510, 512 may be any device capable of causing fluid to flow into a vortex. Examples of vortex-causing devices 510, 512 include teeth, protrusions, and devices having square, cylindrical, and/or triangular cross-sectional shapes. The flow control device also includes tunnels 514, 516 from pressure ports 518, 520 to a port 522 positioned closer to the bifurcation point 508 than the pressure ports 518, 520. A tunnel may be a passageway capable of carrying pressure from a first location to a second location.

Vortices caused by the vortex-causing devices 510, 512 may form proximate the pressure ports 518, 520 such that each of the pressure ports 518, 520 are positioned in an area proximate the respective vortex. The vortices may form a pressure difference in the area proximate the vortex. The pressure ports 518, 520 can communicate the pressure difference to port 522. The pressure difference at port 522 can influence an angle at which fluid flows into the bifurcation point 508.

For example, fluid having a certain amount of one or more properties, such as a flow having a Reynolds number in a certain range, may form a relatively low pressure in the area proximate each of the vortices. The relatively low pressure can be communicated via tunnels 514, 516 to port 522. The relatively low pressure at port 522 can guide fluid to flow into the bifurcation point 508 at an angle at which more of the fluid flows through one of the two passageways 524, 526 fluidly coupling the bifurcation point 508 to the vortex chamber 504. Fluid having a different amount of one or more properties, such as fluid flow having a Reynolds number in a different range, may form a pressure that is higher than the relatively low pressure, but still may be a low pressure as compared to pressure in other areas of the flow control device. The pressure can be communicated via tunnels 514, 516 to port 522. The pressure at port 522 can influence the flow less than the relatively low pressure such that more fluid flows into the bifurcation point 508 at a different angle, and more fluid flows through a different one of the two passageways 524, 526.

Depending on the passageway through which fluid flows into the vortex chamber 504, more or less fluid may be restricted from flowing through an opening 528. For example, fluid flowing to the vortex chamber 504 through passageway 524 may be allowed to exit the opening 528 and fluid flowing to the vortex chamber 504 through passageway 526 may be restricted from exiting the opening 528.

Figure 7:
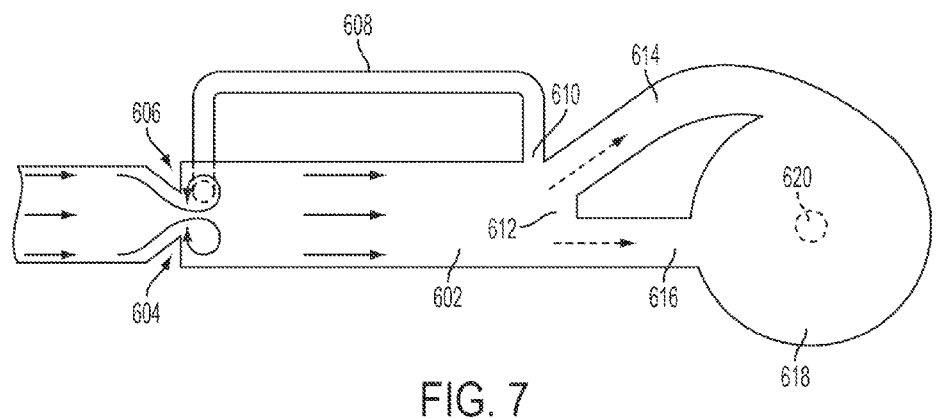
FIG. 7 is a cross-sectional side view of a vortex chamber and a chamber having two vortex-causing devices and a tunnel according to one embodiment of the present invention.

Chambers according to various embodiments may include any number of vortex-causing devices and tunnels. FIG. 7 depicts a cross-sectional side view of a chamber 602 that includes two vortex causing devices 604, 606 and one tunnel 608. Vortex-causing devices 604, 606 cause fluid flowing in the chamber 602 to flow into vortices. Fluid flowing into the chamber Fluid flow is depicted in FIG. 7 using arrows. Vortex-causing device 606 causes fluid to flow into a vortex that can define an area proximate to an opening in the tunnel 608. Vortex-causing device 604 causes fluid to flow into a vortex that can help keep flow of fluid centered through the chamber 602. The tunnel 608 can communicate pressure from the area, or close to the area, proximate the vortex caused by vortex-causing device 606 to a port 610 that is at a location proximate a bifurcation point 612. Depending on the level of pressure, which can depend on one or more properties of the fluid, at the location fluid flowing into the bifurcation point 612 may be influenced to enter at a certain angle by which the fluid can be selected. For example, a relatively low pressure at the location may influence fluid to flow at an angle by which more fluid flows through one passageway 614 than a second passageway 616 to a vortex chamber 618 with an opening 620. Fluid flowing through passageway 614 may flow into the vortex chamber 618 such that more fluid is restricted from exiting through opening 620. Fluid flowing through passageway 616 may flow into the vortex chamber 618 such that more fluid is allowed to exit through opening 620.

Figure 8:
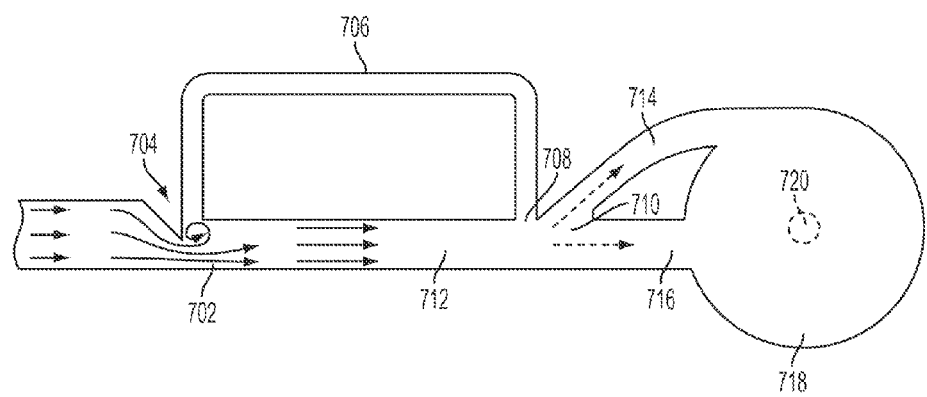
FIG. 8 is a cross-sectional side view of a vortex chamber a chamber having a vortex-causing device and a tunnel according to one embodiment of the present invention.

FIG. 8 depicts a chamber 702 with one vortex-causing device 704 according to one embodiment. The vortex-causing device 704 causes fluid entering the chamber 702 to flow into a vortex proximate an opening to a tunnel 706 that communicates pressure to a port 708 at a location proximate a bifurcation point 710. The width of the flow path 712 in the chamber is configured to allow fluid flow to be relatively centered without the need additional vortex-causing devices. Depending on the level of pressure at the location, which can depend on one or more properties of the fluid, fluid may enter the bifurcation point 710 by which the fluid can be selected. For example, a low pressure at the location may influence fluid to flow into the bifurcation point 710 such that more fluid flows through passageway 714 than through passageway 716 to a vortex chamber 718 that includes an opening 720. More fluid flowing into the vortex chamber 718 from passageway 714 may be restricted from exiting through opening 720. More fluid flowing into the vortex chamber 718 from passageway 716 may be allowed to exit through the opening.

Chambers according to other embodiments do not include a tunnel. For example, a vortex-causing device may cause fluid to flow into a vortex at a certain location within the chamber. The vortex may cause a pressure drop at the location that influences an angle by which fluid flows into a bifurcation point.

Figure 9:
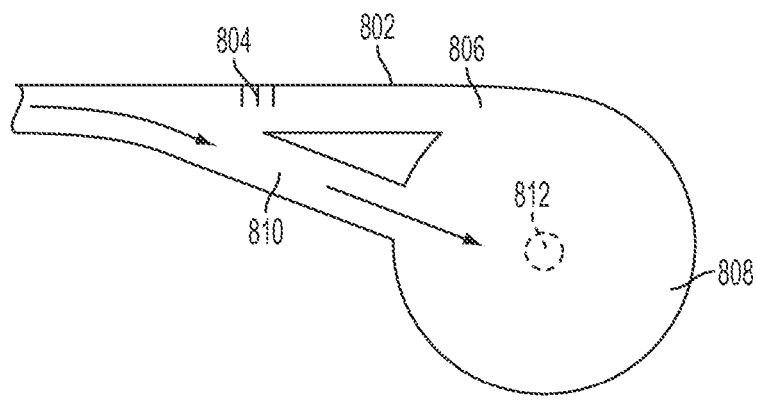
FIG. 9 is a cross-sectional view of a vortex chamber and a flow influencer device that includes whiskers in a restricted position according to one embodiment of the present invention.
Figure 10:
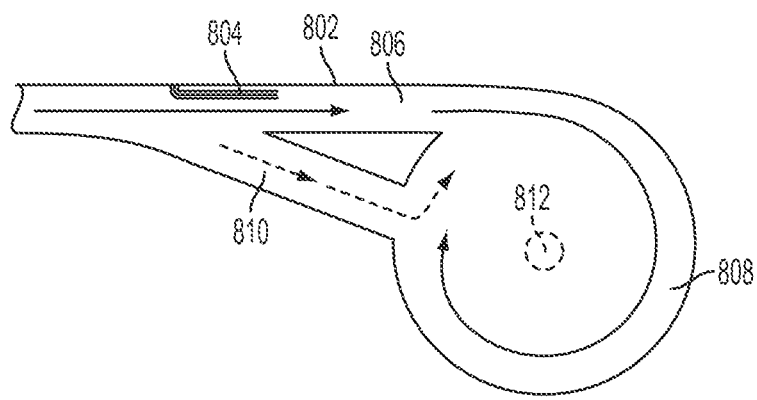
FIG. 10 is a cross-sectional view of the vortex chamber and the whiskers of FIG. 9 in an open position according to one embodiment of the present invention.

Flow influencer devices according to other embodiments may be whiskers. FIGS. 9-10 depict a chamber 802 having whiskers 804 positioned in a passageway 806 to a vortex chamber 808. The chamber 802 includes a second passageway 810 to the vortex chamber. Whiskers 804 may have a wide variety of cross-sectional shape configurations. For example, some whiskers have a consistent cross-sectional shape along a length of whiskers, while other whiskers have a variable cross-sectional shape. In some embodiments, whiskers have variable cross-sections. For example, a whisker may have a small cross-sectional shape at a first end and a larger cross-sectional shape at a second end.

Fluid having certain amounts of one or more properties flowing through the chamber 802 may impinge on whiskers 804, but do not cause the whiskers to change position. As shown in FIG. 9, the whiskers 804 direct more of the fluid to flow through passageway 810 to the vortex chamber 808. The fluid flowing through passageway 810 may be guided to an opening 812 in the vortex chamber 808.

Fluid that has different properties, such as one or more properties in a certain range, may flow through the chamber 802 and create a pressure drop across the whiskers 804. In response, the whiskers 804 can change position, as depicted in FIG. 10, to allow the fluid to flow through passageway 806 to the vortex chamber 808. Fluid flowing through passageway 806 may enter the vortex chamber 808 at a tangential angle, resulting in fluid flowing in a vortex about the opening 812 such that more fluid is restricted from exiting through the opening 812.

In one embodiment, whiskers 804 can be used to restrict fluid having a higher concentration of an undesirable type of fluid, such as water. Water may have a fluid momentum (i.e. velocity multiplied by density) in a higher range and causes the whiskers 804 to change position, such as in FIG. 10. More of the water can flow through passageway 806 and enter the vortex chamber 808 at a tangential angle, such that water is restricted from flowing through the opening 812.

In other embodiments, whiskers may be located in passageway 810 proximate the vortex chamber 808 and are configured to change position into the vortex chamber 808 in response to desirable fluid flowing through the chamber 802. Whiskers changing position into the vortex chamber 808 can minimize rotation within the vortex chamber 808 of desirable fluid to cause more of the desirable fluid to exit the opening 812. When undesirable fluid flows through the chamber 802, the whiskers may be configured to retain a position in passageway 810 to restrict undesirable fluid from flowing through passageway 810 to the vortex chamber 808 and exiting through opening 812.

Figure 11:
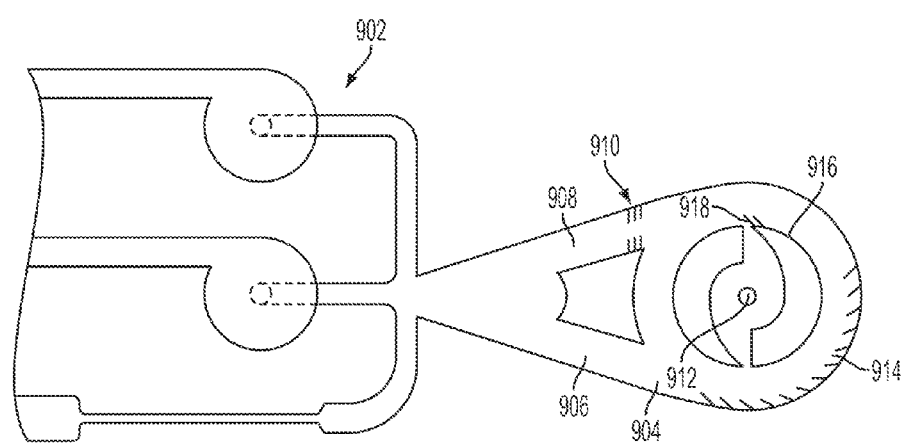
FIG. 11 is a cross-sectional view of a switch system and a vortex chamber having whiskers in various positions therein according to one embodiment of the present invention.

Whiskers according to various embodiments can be positioned in other and additional locations in a flow control device. FIG. 11 depicts a flow control device that includes a switch system 902, a vortex chamber 904, and two passageways 906, 908 for fluid flow to the vortex chamber 904. Whiskers 910 are positioned in passageway 908. Whiskers 910 may be configured to change position in response to fluid having certain properties flowing through passageway 908. For example, fluid having a higher velocity and/or density may cause whiskers 910 to change position and allow more fluid to flow into the vortex chamber 904 from the passageway 908. Fluid entering the vortex chamber 904 via passageway 908 may be more restricted from exiting through an opening 912 in the vortex chamber 904 than fluid entering the vortex chamber 904 via passageway 906. In some embodiments, whiskers 910 can restrict fluid flow in response to gas and/or water coning when a formation produces a large amount of undesirable fluid.

The vortex chamber 904 includes whiskers 914 on an inner surface of the vortex chamber 904. Whiskers 914 are configured to change position based on a direction of fluid flow and at least one property of the fluid. For example, whiskers 914 can be in a position that allows fluid flow with limited restriction in response to fluid having a certain amount of one or more properties flowing in a clockwise direction about the vortex chamber 904. Whiskers 914 can be in a position that restricts fluid flow more in response to fluid having a different amount of one or more properties flowing in a counter-clockwise direction about the vortex chamber 904 such that this fluid is influenced more to the opening 912.

The vortex chamber 904 includes vane elements 916. Vane elements 916 can increase rotational speed of fluid, such as fluid entering from passageway 908, flowing about the vortex chamber 904, and can increase pressure drop caused by rotating fluid. Vane elements 916 may be configured to guide fluid flowing in a counter-clockwise direction in the vortex chamber 904 to the opening 912. Whiskers 918 may be positioned on vane elements 916. Whiskers 918 can change position based on one or more properties of fluid and fluid flow direction. For example, whiskers 918 may be in a first position, such as the position depicted in FIG. 11, in response to fluid having certain properties flowing in a counter-clockwise direction in the vortex chamber 904. Whiskers 918 in the first position can restrict rotational fluid flow and influence fluid to flow to the opening 912. Whiskers 918 may change to a second position in response to fluid having certain different properties flowing in a clockwise direction in the vortex chamber 904. Whiskers in the second position can affect rotational fluid flow less such that less fluid exits through opening 912.

Whiskers can be positioned in other portions of the flow control device depicted in FIG. 11. For example, whiskers may be positioned on an inner wall of vane elements 916 to provide more or less fluid restriction as desired and based on one or more properties of the fluid. In some embodiments, vane elements 916 are replaced with whiskers that are configured, for example, to be in a first position that affects rotational fluid flow less in response to fluid flowing in a counter-clockwise direction and in a second position the affects rotational fluid flow more in response to fluid flowing in a clockwise direction.

Figure 12:
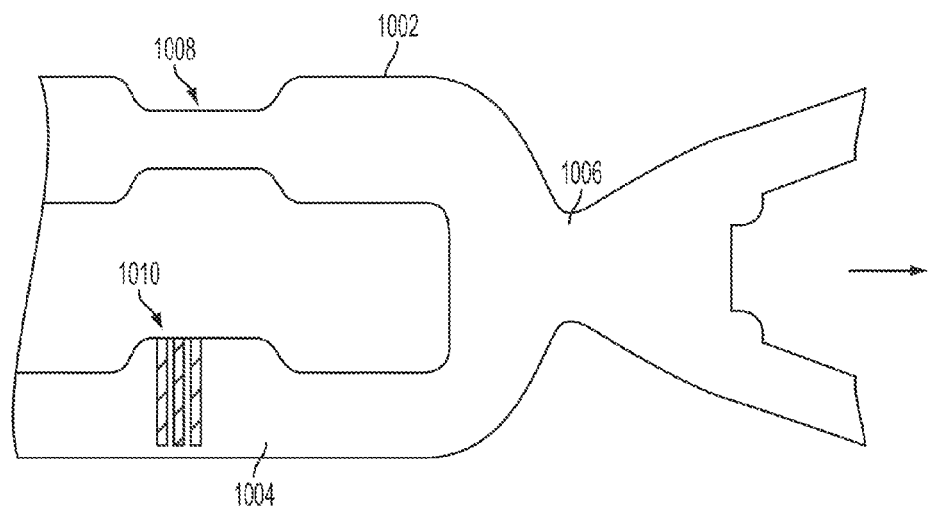
FIG. 12 is a cross-sectional view of a flow control device having a passageway with an orifice and a passageway with whiskers according to one embodiment of the present invention.

Whiskers according to some embodiments may be usable to control fluid flow for fluid selection. FIG. 12 depicts part of a flow control device having two passageways 1002, 1004 from an inlet to a bifurcation point 1006 for fluid selection. Passageway 1002 includes an orifice 1008. An orifice 1008 can include a portion of a flow path in the passageway 1002 that has a smaller diameter than other portions of the passageway 1002. Passageway 1004 includes whiskers 1010 extending into the flow path of the passageway 1004.

In response to fluid flowing through the flow control device having a low flow rate, whiskers 1010 can restrict flow of fluid through passageway 1004 such that more fluid flows through passageway 1002. In response to fluid having a higher flow rate, the whiskers 1010 can change position to restrict fluid flow through the passageway 1004 less such that more fluid flows through passageway 1004. The whiskers 1010 and orifice 1008 can provide a more constant flow rate through the remainder of the flow control device.

Figure 13:
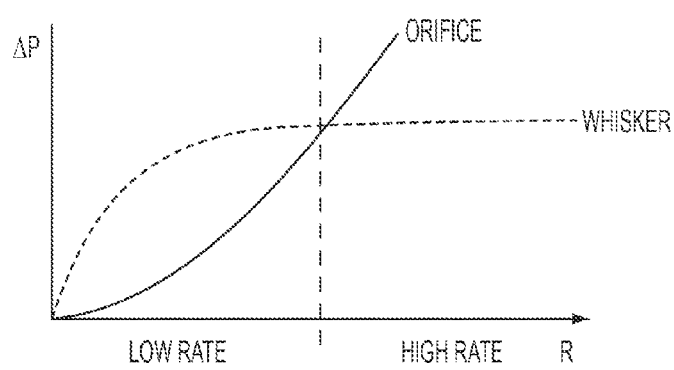
FIG. 13 is a chart depicting change in pressure for fluid flow through the passageway with the orifice and the passageway with whiskers in FIG. 12 with respect to flow rate according to one embodiment of the present invention.

FIG. 13 is a chart depicting change in pressure (ΔP) for fluid flow through passageway 1002 with the orifice 1008 and passageway 1004 with whiskers 1010 with respect to flow rate (R). At low flow rates, change in pressure for passageway 1004 increases faster than pressure for passageway 1002, as the low flow rate increases. At high flow rates, the change in pressure for passageway 1002 continues to increase, while pressure for passageway 1004 is more constant. In some embodiments, fluid flowing at a high rate through passageway 1004 may be more likely to flow through flow control device than fluid flowing through passageway 1002, due to an increasing change in pressure for fluid flowing through passageway 1002.

Figure 14:
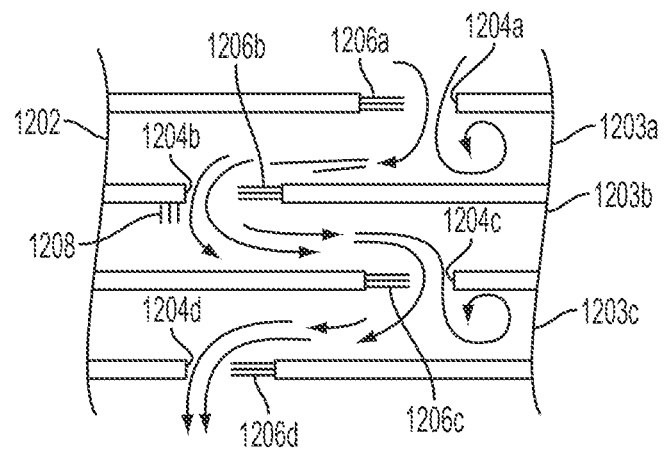
FIG. 14 is a cross-sectional view of an interdigitated flow path having whiskers in a first position located in openings according to one embodiment of the present invention.
Figure 15:
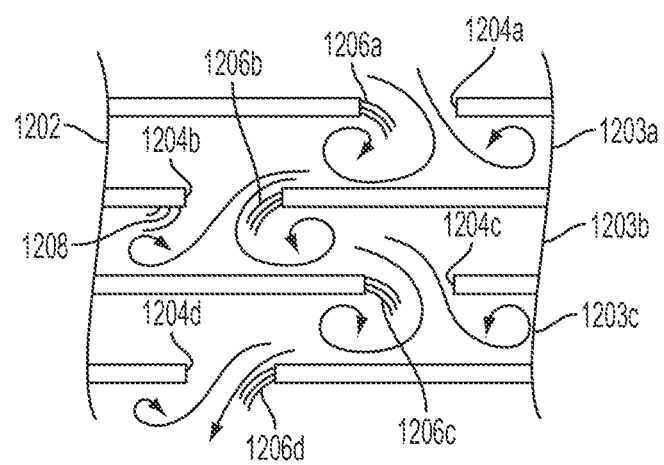
FIG. 15 is a cross-sectional view of the interdigitated flow path of FIG. 14 with whiskers is a second location according to one embodiment of the present invention.

Whiskers according to other embodiments can be used in different types of flow paths, such as interdigitated flow paths. FIGS. 14-15 depict a cross-sectional view of an interdigitated flow path 1202 that may be in a flow control device for selecting fluid based on one or more properties. The interdigitated flow path 1202 is defined by multiple stages 1203*a-c* having multiple openings 1204*a-d* between the stages 1203*a-c*. Each opening is offset from adjacent opening such that fluid flows in a "zig-zag" pattern through the interdigitated flow path 1202, as depicted by arrows representing fluid flow. Each opening includes whiskers 1206*a-d* located therein.

Whiskers 1206*a-d* may influence flow for fluid having certain amounts of one or more properties and flowing at a low flow rate (including flowing at a low change in pressure) through the interdigitated flow path 1202 such that the interdigitated flow path 1202 provides less resistance to fluid flow. For example, at least some of the fluid may flow through the interdigitated flow path 1202 without flowing into a turbulence structure, such as an eddy or vortex, that may restrict fluid flow. In response to fluid having different amounts of one or more properties and flowing at a high flow rate (including flowing at a high change in pressure) through the interdigitated flow path 1202, the whiskers 1206*a-d* may deflect into the interdigitated flow path 1202, which can change the flow path of fluid flow. Fluid flowing through the changed flow path may rotate more in the interdigitated flow path 1202 such that the interdigitated flow path 1202 restricts, or otherwise provides more resistance to, fluid flow. For example, more fluid flowing into a turbulence structure, such as an eddy or vortex, may increase a pressure drop for fluid flow in one or more of the stages 1203*a-c* such that fluid flowing interdigitated flow path 1202 experiences an increase in flow resistance or restriction.

Interdigitated flow paths according to some embodiments may also or alternatively include whiskers on other portions of a device defining a flow path. For example, whiskers 1208 may be positioned on a portion that includes an opening 1204*b* and extend into a flow path of stage 1203*b*. The whiskers 1208 in FIG. 14 can guide fluid toward opening 1204*c* instead of an edge of the device defining the interdigitated flow path 1202. In FIG. 14, the whiskers 1208 move position to allow more fluid to flow towards the edge of the device defining the interdigitated flow path 1202.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A flow control device configured for being disposed between a subterranean formation and a tubular in a wellbore, the flow control device comprising:
    a chamber having (i) an exit opening and (ii) a flow path; and
    a flow influencer device in the chamber, the flow influencer device being configured to affect fluid flowing into a turbulence having a structure that is based on at least one property of the fluid and the flow influencer device, wherein the chamber is configured for restricting fluid flow in the flow path by different amounts based on the structure of the turbulence, wherein the chamber comprises:
        an inlet at a first end of the chamber; and
        a second exit opening located between the exit opening and a second end of the chamber,
    wherein the flow influencer device is a diverter positioned between the inlet and the exit opening and configured to influence flow of fluid based on the at least one property (i) toward the exit opening and (ii) toward the second exit opening, by causing the fluid to flow into the turbulence that is a vortex and creating an area of low pressure between the diverter and the second end of the chamber.

2. The flow control device of claim 1, wherein the at least one property of the fluid comprises at least two of:
    Reynolds number of the fluid flow;
    fluid density;
    fluid velocity; or
    fluid viscosity.

3. The flow control device of claim 1 wherein the flow influencer device is configured to restrict fluid flow in a first position and allow fluid flow in a second position.

4. The flow control device of claim 3, wherein the flow influencer device is configured to at least partially restrict fluid from flowing to the exit opening in the first position in response to fluid having a first value of the at least one property and to move to the second position to allow fluid to flow to the exit opening in response to fluid having a second value of the at least one property of the fluid.

5. The flow control device of claim 4, wherein the diverter comprises a flexible member coupling the diverter to the chamber,
    wherein the diverter is configured for causing fluid to flow into the turbulence that is a shedding vortex,
    wherein the flexible member is configured to change position by coupling to the fluid flowing into the shedding vortex in response to the fluid having the second value of the at least one property.

6. A flow control device configured for being disposed between a subterranean formation and a tubular in a wellbore, the flow control device comprising:
    a chamber having (i) an exit opening and (ii) a flow path; and
    a flow influencer device in the chamber, the flow influencer device being configured to affect fluid flowing into a turbulence having a structure that is based on at least one property of the fluid and the flow influencer device, wherein the chamber is configured for restricting fluid flow in the flow path by different amounts based on the structure of the turbulence, wherein the flow influencer device is a vortex-causing device, wherein the chamber comprises:
  a port positioned closer to the exit opening than the vortex-causing device; and
  a tunnel configured for communicatively coupling pressure to the port from an area proximate the turbulence that is a vortex,
wherein the pressure at the port is configured to influence an angle of entry of the fluid into the exit opening.

7. The flow control device of claim 6, wherein the vortex-causing device comprises:
  a first device configured for causing fluid to flow into the vortex; and
  a second device configured for causing fluid to flow into a second vortex,
  wherein the chamber further comprises:
    a second tunnel configured for communicatively coupling pressure from a second area proximate the second vortex to the port.

8. The flow control device of claim 6, wherein the vortex-causing device is coupled to a wall of the chamber, the vortex-causing device having at least one of:
  a square cross-sectional shape;
  a cylindrical cross-sectional shape; or
  a triangular cross-sectional shape.

9. A flow control device configured for being disposed between a subterranean formation and a tubular in a wellbore, the flow control device comprising:
  a chamber having (i) an exit opening and (ii) a flow path; and
  a flow influencer device in the chamber, the flow influencer device being configured to affect fluid flowing into a turbulence having a structure that is based on at least one property of the fluid and the flow influencer device, wherein the chamber is configured for restricting fluid flow in the flow path by different amounts based on the structure of the turbulence,
  wherein the flow influencer device is configured to restrict fluid flow in a first position and allow fluid flow in a second position, wherein the chamber comprises:
    a vortex chamber in which the exit opening is located;
    a first passageway in fluid communication with the vortex chamber for guiding fluid into a vortex in the vortex chamber; and
    a second passageway in fluid communication with the vortex chamber for guiding fluid toward the exit opening,
  wherein the flow influencer device is a whisker configured to be in the first position in response to fluid having a first value of the at least one property and to be in the second position in response to fluid having a second value of the at least one property, wherein the whisker is coupled to a wall of the vortex chamber, the whisker being configured to restrict fluid flow in a first direction and to allow fluid flow in a second direction that is opposite to the first direction.

10. A flow control device configured for being disposed between a subterranean formation and a tubular in a wellbore, the flow control device comprising:
  a chamber having (i) an exit opening and (ii) a flow path; and
  a flow influencer device in the chamber, the flow influencer device being configured to affect fluid flowing into a turbulence having a structure that is based on at least one property of the fluid and the flow influencer device, wherein the chamber is configured for restricting fluid flow in the flow path by different amounts based on the structure of the turbulence,
  wherein the flow influencer device is configured to restrict fluid flow in a first position and allow fluid flow in a second position, wherein the chamber comprises:
    a vortex chamber in which the exit opening is located;
    a first passageway in fluid communication with the vortex chamber for guiding fluid into a vortex in the vortex chamber; and
    a second passageway in fluid communication with the vortex chamber for guiding fluid toward the exit opening,
  wherein the flow influencer device is a whisker configured to be in the first position in response to fluid having a first value of the at least one property and to be in the second position in response to fluid having a second value of the at least one property, wherein the vortex chamber comprises at least one vane element at least partially disposed about the exit opening.

11. The flow control device of claim 10, wherein the at least one vane element is the whisker.

12. The flow control device of claim 10, wherein the whisker is coupled to a wall of the at least one vane element.

13. A flow control device configured for being disposed between a subterranean formation and a tubular in a wellbore, the flow control device comprising:
  a chamber having (i) an exit opening and (ii) a flow path; and
  a flow influencer device in the chamber, the flow influencer device being configured to affect fluid flowing into a turbulence having a structure that is based on at least one property of the fluid and the flow influencer device, wherein the chamber is configured for restricting fluid flow in the flow path by different amounts based on the structure of the turbulence, wherein the flow path is an interdigitated flow path formed by at least part of the chamber,
  wherein the flow influencer device is a whisker extending at least partially into the interdigitated flow path, the whisker being configured to increase pressure drop across at least part of the interdigitated flow path when the at least one property of the fluid is in a first range and maintain a substantially constant pressure drop across at least part of the interdigitated flow path when the at least one property of the fluid is in a second range.

14. A flow control device capable of being disposed in a wellbore, the flow control device comprising:
  a flow influencer device in a chamber, the flow influencer device being configured to control flow of fluid between a formation and a tubular by influencing flow of fluid in a first direction when a Reynolds number of the flow of fluid is in a first range and by influencing flow of fluid in a second direction when the Reynolds number of the flow of fluid is in a second range that is different than the first range, wherein the chamber comprises:
    an exit opening;
    an inlet at a first end of the chamber; and
    a second exit opening located between the exit opening and a second end of the chamber,
  wherein the flow influencer device is a diverter positioned between the inlet and the exit opening, the diverter being configured to cause fluid to flow into a turbulence that is a vortex and create an area of low pressure between the diverter and the second end of the chamber, wherein the first direction is toward the exit opening and the second direction is toward the second exit opening.

15. The flow control device of claim 14, wherein the flow influencer device is configured to control flow of fluid between the formation and the tubular based on the Reynolds number and at least one of:

fluid density;
fluid velocity; or
fluid viscosity.

16. A flow control device capable of being disposed in a wellbore, the flow control device comprising:

a flow influencer device in a chamber, the flow influencer device being configured to control flow of fluid between a formation and a tubular by influencing flow of fluid in a first direction when a Reynolds number of the flow of fluid is in a first range and by influencing flow of fluid in a second direction when the Reynolds number of the flow of fluid is in a second range that is different than the first range, wherein the flow influencer device is a vortex-causing device configured to cause fluid to flow into a turbulence that is a vortex having a structure that is based on the Reynolds number of the flow of fluid, wherein the chamber comprises:

an exit opening;
a port positioned closer to the exit opening than the vortex-causing device; and
a tunnel configured for communicatively coupling pressure from an area proximate the vortex to the port, wherein the pressure at the port is configured to influence flow of fluid in the first direction or the second direction, the first direction corresponding to a first angle of flow into the exit opening, the second direction corresponding to a second angle of flow into the exit opening.

* * * * *

UNITED STATES PATENT AND TRADEMARK OFFICE
CERTIFICATE OF CORRECTION

PATENT NO. : 9,157,298 B2  
APPLICATION NO. : 13/704024  
DATED : October 13, 2015  
INVENTOR(S) : Michael Linley Fripp et al.

Page 1 of 1

It is certified that error appears in the above-identified patent and that said Letters Patent is hereby corrected as shown below:

In column 7, line 67, delete "though" and insert -- through --, therefor.

In column 14, line 42, in claim 3, delete "claim 1" and insert -- claim 1, --, therefor.

Signed and Sealed this
Twenty-sixth Day of July, 2016

Michelle K. Lee
*Director of the United States Patent and Trademark Office*